United States Patent
Müller et al.

(10) Patent No.: US 11,493,341 B2
(45) Date of Patent: Nov. 8, 2022

(54) SCANNING SURVEYING DEVICE

(71) Applicant: LEICA GEOSYSTEMS AG, Heerbrugg (CH)

(72) Inventors: Josef Müller, Oberegg (CH); Christoph Herbst, Dornbirn (AT); Lukasz Kucharczyk, Rorschacherberg (CH); Christian Niklaus, Bad Ragaz (CH); Markus Geser, Horn (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 369 days.

(21) Appl. No.: 16/894,768

(22) Filed: Jun. 6, 2020

(65) Prior Publication Data
US 2020/0386548 A1    Dec. 10, 2020

(30) Foreign Application Priority Data
Jun. 7, 2019   (EP) .................................... 19179128

(51) Int. Cl.
*G01C 15/00* (2006.01)
*G01S 17/08* (2006.01)
*G01S 7/481* (2006.01)

(52) U.S. Cl.
CPC .......... *G01C 15/008* (2013.01); *G01S 7/4814* (2013.01); *G01S 7/4817* (2013.01); *G01S 17/08* (2013.01)

(58) Field of Classification Search
CPC ... G01C 15/002; G01C 15/008; G01S 7/4814; G01S 7/4817; G01S 17/08
See application file for complete search history.

(56) References Cited

U.S. PATENT DOCUMENTS

| | | | |
|---|---|---|---|
| 6,420,698 B1 | 7/2002 | Dimsdale | |
| 7,804,498 B1* | 9/2010 | Graham | ................ G06T 11/206 345/419 |
| 10,365,352 B2* | 7/2019 | Nordenfelt | .............. G01S 17/42 |
| 10,890,446 B2* | 1/2021 | Bernhard | .............. G01B 11/002 |
| 11,333,496 B2* | 5/2022 | Ohtomo | .................... G01S 7/51 |

(Continued)

FOREIGN PATENT DOCUMENTS

| | | |
|---|---|---|
| EP | 3021077 A1 | 5/2016 |
| EP | 3376161 A1 | 9/2018 |
| EP | 3 450 915 A1 | 3/2019 |

OTHER PUBLICATIONS

European Search Report and Written Opinion dated Dec. 20, 2019 as received in application No. 19179128.4.

*Primary Examiner* — Tsion B Owens
(74) *Attorney, Agent, or Firm* — Maschoff Brennan

(57) ABSTRACT

An industrial or geodetic surveying device with a scan functionality including an alidade rotating about a standing axis and a telescope unit with a beam exit for a laser measuring beam. The telescope unit is mounted on the alidade and is movable in a tilting motion about an elevation axis substantially orthogonal to the standing axis. The scan functionality comprises a scan sequence with an angular velocity of the alidade around the standing axis, wherein during the scan sequence the alidade is in a continuous revolving motion with mainly constant angular velocity about the standing axis, and the angular velocity of the alidade is faster than half of the angular velocity of the tilting motion of the telescope unit about the elevation axis.

12 Claims, 5 Drawing Sheets

(56) References Cited

U.S. PATENT DOCUMENTS

2010/0303300 A1* 12/2010 Svanholm ................ G01C 1/04
                                                                      348/135
2020/0386548 A1* 12/2020 Müller .................. G01C 15/002
2022/0229182 A1*  7/2022 Ohtomo ............... G01C 15/008

* cited by examiner

State of the Art

SCANNING SURVEYING DEVICE

CROSS-REFERENCE TO RELATED APPLICATIONS

This application claims priority to European Patent Application No. 19179128.4, filed on Jun. 7, 2019. The foregoing patent application is herein incorporated by reference.

FIELD OF THE INVENTION

The present invention relates to a scanning surveying device built as theodolite or total station or laser tracker with an alidade and a telescope. The alidade is rotatable about a standing axis and the telescope is mounted on the alidade and tiltable about an elevation axis. The telescope is comprising a beam exit for a laser distance measuring beam. The elevation axis is substantially orthogonal to the standing axis.

BACKGROUND

For the alignment of the distance measuring beam on a target, typically both the alidade and also the telescope are moved, wherein for a special surveying task, at least one movement of the alidade or the telescope is necessary. Alidade and telescope are often comparatively heavy and therefore a scanning task with oscillatory movements of the alidade and the telescope is energy consuming and/or slow.

Time consumption can be reduced by limiting the size of the region for which the distance measurements are made. This limitation doesn't significantly reduce the number of oscillatory movements and therefore doesn't sufficiently reduce the energy consumption.

Energy consumption can be reduced when scanning is executed by rotating the alidade and the telescope, each with a constant speed of rotation. Energy is used at the beginning and at the end of a scanning task for accelerating and braking. According to the state of the art, the telescope has a smaller weight then the alidade and therefore the telescope is rotated with a higher speed of rotation then the alidade. For a full dome scan the alidade is rotating either with a low constant speed or stepwise at least over half a circle (200 gon, 180°).

Scanning tasks with a fast rotating telescope and a slower rotating alidade have a non-uniform grid with a high density of distance measurements in the zenith region and in the nadir region. For the majority of scanning tasks these regions are of low interest. The total scanning time and effort spent to get measuring points of interest, for example in the equatorial region, is high. Therefore, the known scanning with a fast rotating telescope and a slow rotating alidade doesn't sufficiently reduce the time consumption of a scanning task.

EP 3 450 915 A1 discloses a solution to improve the scanning rate. According to this solution the telescope has an additional rapid deflection element, for rapid deflection of the outgoing distance measuring beam in relation to the telescope. This rapid deflection of the distance measuring beam is used for measurements effectuated within specific acquisition regions.

However, the alidade and the telescope have to be moved as well for scanning a given acquisition region. The Alidade and the telescope have to be driven with speeds and accelerations needed for a path sufficiently covering the acquisition region. A path covering the acquisition region has to have curves keeping the path within the region. At least at some of these curves the alidade and/or the telescope has to brake or accelerate its movement and therefore to use energy and time.

BRIEF SUMMARY OF THE INVENTION

It is therefore an object of some aspects of the present invention to find a theodolite or a total station or a laser tracker for scanning defined acquisition regions with low energy and time consumption and preferably with optimized densities of measuring points.

At least parts of these objects are achieved by realizing the features of the independent claims. Features which further develop the invention in an alternative or advantageous manner are described in the dependent patent claims.

Some aspects of the invention relate to an industrial or geodetic surveying device, built as theodolite or total station or laser tracker including a base defining a standing axis, an alidade, mounted on the base and being rotatable about the standing axis in a motor driven manner, a telescope unit comprising a beam exit for a laser measuring beam defining a target axis, the telescope unit being mounted on the alidade and being movable in the form of a tilting motion about an elevation axis relative to the alidade in a motor driven manner, the elevation axis being substantially orthogonal to the standing axis, a distance measuring unit, configured to generate the laser measuring beam and, based thereof, to provide distance measurement data for determining a distance to an object, wherein the laser measuring beam is extending from the telescope unit along a target axis, an angle determining unit configured to provide angle determination data for determining the orientation of the alidade to the base and the orientation of the telescope unit to the alidade, respectively, and a control unit configured to automatically control a scan functionality of the surveying device, the scan functionality comprising generation of distance measurement data and angle determination data for different scan points set by rotating the alidade about the standing axis and by tilting the telescope unit about the elevation axis, respectively.

The inventive industrial or geodetic surveying device is characterized in that the scan functionality comprises a scan sequence with an angular velocity of the alidade around the standing axis, wherein during the scan sequence, i.e. for at least main parts of a time window of the scan sequence, the alidade is in a continuous revolving motion with uniform, in particular mainly constant, angular velocity about the standing axis, and the angular velocity of the alidade about the standing axis is faster than half of the angular velocity of the tilting motion of the telescope unit about the elevation axis, in particular faster than the angular velocity of the tilting motion of the telescope unit.

The uniform, in particular constant, angular velocity of the continuously revolving heavy alidade is related to a minimum energy consumption. In a typical Total Station the moment of inertia of the alidade is higher than the moment of inertia of the telescope unit and the friction of the rotation of the alidade is lower than the friction of the movement of the telescope unit. Therefore, the power consumption is reduced if the alidade rotates with a uniform velocity which is higher than the velocity of the tilting motion of the telescope unit.

The standing axis is used to execute most of the movement during the scan and it is therefore called major axis. In the solutions of the state of art of scanning Total Stations the elevation axis is the major axis. Changing the major axis to be the standing axis and rotating the alidade with a constant angular velocity reduces the time consumption.

During a scan sequence, the uniform angular velocity of the continuously revolving heavy alidade is chosen to be constant or vary only little over most parts of the duration of the scan sequence. For example, during at least half of the duration of the scan sequence, the angular velocity of the continuously revolving alidade is chosen to have a variation of max.±10%.

In a preferred embodiment at least in an overall trend the direction of rotation of the tilting motion of the telescope is constant during a scan sequence.

The densities of measuring points on a unit sphere with its center at the intersection point of the standing and the elevation axis depends on the path of the measuring beam projection on the unit sphere and on the triggering of distance measurements. The alidade is revolving with a constant angular velocity about the standing axis and the tilting motion of the telescope unit about the elevation axis has a angular velocity about the elevation axis which is smaller than the angular velocity of the alidade about the standing axis.

Therefore, small sections of paths of the measuring beam projection on the unit sphere have longer components around the standing axis than around the elevation axis. The lengths of sections of such paths which are extending over a given angle around the standing axis are getting shorter with shorter distances to the standing axis. In equatorial regions of the unit sphere sections of such paths which are extending over a given angle around the standing axis have similar lengths. The measuring points projected onto the unit sphere are evenly distributed in the equatorial regions. The tilting motion of the telescope unit about the elevation axis is controlling the gap between neighboring measuring points on successive turns of the path around the standing axis.

If differences in densities of measuring points have to be prevented, then the number of measuring points on path sections extending over a given angle around the standing axis and having different lengths should have numbers of measuring points corresponding to the specific length of the sections. This means that toward the standing axis there should be less measuring points on such sections because of their shorter length within the same angle around the standing axis.

High densities of measuring points close to the standing axis and at zenith or nadir areas, respectively, can be prevented either by preventing the paths from getting to close to the standing axis or by reducing the triggering frequency for distance measurements with the measuring beam and the target axis moving towards the standing axis.

In a preferred embodiment the control unit is configured to coordinate the angular velocity of the revolving motion of the alidade, the tilting motion of the telescope unit and the distance measuring unit in a way that, in a projection onto a surface of a sphere around the surveying device, a grid with even point spacing is generated.

The distance measuring unit can make distance measurements with a constant trigger frequency or the distance measurements are triggered by a parameter depending on the alignment of the laser measuring beam and the target axis, respectively.

In a preferred embodiment the movement of the telescope is preventing the paths from getting to close to the standing axis and to a zenith or nadir area, respectively. This can be done by limiting the tilting motion of the telescope unit about the elevation axis to an up and/or down motion without full turns. With this limitation the laser measuring beam extending from the telescope unit along a target axis is never parallel to the standing axis and it is not hitting the unit sphere close to the standing axis. In equatorial regions of the unit sphere, the length variations of path turns around the standing axis is small. Therefore, in equatorial regions, the point densities generated with a constant triggering frequency show only small variations with varying angles about the elevation axis.

In a further preferred embodiment the scan functionality comprises a motion of the telescope unit about the elevation axis such that, in a projection onto a sphere around the surveying device, the target axis follows a trajectory spiraling around the standing axis. A constant turning of the alidade and an up and/or down motion without full turns of the telescope is generating spiral paths on the unit sphere. The telescope has a smaller moment of inertia than the alidade and the angular velocity of the tilting motion of the telescope unit about the elevation axis is smaller than the angular velocity of the alidade about the standing axis. Therefore, the energy needed for generating these spiral paths is small.

Therefore, the scan functionality comprises a motion of the telescope unit about the elevation axis such that, in a projection onto a sphere around the surveying device, the target axis follows a trajectory spiraling around the standing axis.

During the scan sequence preferably at least in an overall trend the direction of rotation of the tilting motion of the telescope is constant.

In a further preferred embodiment the scan functionality comprises
- a first movement of the telescope unit about the elevation axis from a defined maximal zenith region, particularly zenith, to a defined maximal nadir region, and/or
- a second movement of the telescope unit about the elevation axis from a defined maximal nadir region to a defined maximal zenith region, particularly zenith,
- particularly wherein the sense of rotation of the first movement about the elevation axis is opposite to the sense of rotation of the second movement about the elevation axis.

The up and/or down motion without full turns of the telescope is preventing the paths on the unit sphere from getting close to the standing axis. Instead of keeping the paths away from the standing axis it is also possible to move the measuring beam and the target axis, respectively, close to the standing axis with an increased angular velocity about the elevation axis. The faster angular velocity reduces the number of measurement points on sections of the paths close to the standing axis. This is also the case when the triggering frequency for distance measurements is constant.

When starting from the zenith, a full dome scan is made with a downward spiral track and is finished when the nadir region covered by the frame is reached. A next spiral can be started at this nadir region and moves towards zenith.

The angular velocity about the elevation axis can be varied in such a way that the paths on the unit sphere when projected to a plane have at least a small section which looks similar to a section of a Fibonacci spiral. I.e., the scan functionality can comprise a continuously varying motion of the telescope unit about the elevation axis such that, in a projection onto the unit sphere around the surveying device, the target axis follows a trajectory having sections looking like sections of a Fibonacci spiral.

In a further preferred embodiment the movement of the telescope is made stepwise while the alidade is continuously turning. This allows to make distance measurements along horizontal scan lines.

In a further preferred embodiment the scan functionality comprises a motion of the telescope unit about the elevation axis such that, in a projection onto a sphere around the surveying device, the target axis follows circular trajectories lying in different spaced-apart planes which are orthogonal to the standing axis.

In a further preferred embodiment the scan functionality comprises triggering the distance measuring unit for generating the distance measurement data as a function of the rotation angle of the telescope about the elevation axis. Therefore, the distance measurements are triggered depending on the elevation of the target axis. Maximum frequency triggering will be applied at a horizontal angular alignment of the target axis where the target axis is perpendicular to the standing axis Minimum frequency triggering will be applied at a vertical angular alignment of the target axis where the target axis is parallel to the standing axis. The triggering frequency is increasing with increasing angular distance of the target axis from the standing axis. This triggering is depending on the angular alignment around the elevation axis and allows to have similar measuring point densities on all areas of a unit sphere with its center at the intersection point of the standing and the elevation axis, wherein the measuring points are intersection points of the laser measuring beam with this sphere.

Therefore, the scan functionality comprises triggering the distance measuring unit for generating the distance measurement data as a function of the rotation angle of the telescope about the elevation axis.

In a further preferred embodiment the coupled movements of the alidade and the telescope are handled as a superposition of two perpendicular oscillations with variable frequency and phase differences. Characteristics of such superpositions are known from the analysis of Lissajous figures. If the ratio between the frequency of the movement of the alidade $\omega_A$ and the frequency of the movement of the telescope $\omega_T$ is rational then the generated path is closed. Closed paths are advantageous for short time scans with measuring points spread over the unit sphere with low point densities. For non-rational ratios the path is not closed, which is advantageous for detailed scans with measuring points spread over the unit sphere with high point densities. For a good covering of at least a region of the unit sphere with a path generated by the measuring beam intersecting the unit sphere the ratio between the telescope frequency $\omega_T$ and the alidade frequency $\omega_A$ has to be close to 1, preferably between 5/6 and 1. The covering is better if the phase difference is not an integer multiple of $\pi$. Preferred phase differences are in the range from $\pi/4$ to $3\pi/4$. A phase difference of $\pi/2$ is particularly advantageous.

Some aspects of the inventive solution ensure an increased efficiency in terms of scan time, point density, grid uniformity and power consumption. Additionally, the resulting point cloud is smaller due to uniform point spacing—even in zenith. Furthermore, the nadir region which is hidden by the scanning device itself can be excluded from scanning. The smaller point cloud and the equal grid better fulfill expectations of the user and makes scanning and post processing faster.

With the new concept the scan time of full dome scans is fastened up. Scan tracks with even but reduced measuring point densities can be used for fast scan previews. Partial scans covering is possible with a stripe that spans 400 gon about the standing axis and a desired range about the elevation axis. The elevation range might border on a bottom area of the alidade or on the zenith. An elevation range bordering on the zenith is for example useful for capturing a ceiling. The angular velocity about the standing axis can be optimized in respect of given trigger frequencies and resolutions. A variable trigger frequency and a controllable elevation angel allow for example a high resolution (high density of measuring points) at the equator and a lower resolution (lower density of measuring points) at the poles.

In a preferred embodiment the control unit allows a user to select a scan resolution and scan window. The control unit then selects a corresponding scan modus. A further selection parameter is for example an optimization criterion such as short scan time or low power consumption or fast preview or moving objects suppression. A resulting optimized scan path is determined and a corresponding controlling of the angular movements about the standing and the elevation axis as well as the triggering of the distance measurements are deduced. Not all laser types allow external triggering. Some laser sources run in a self-trigger mode with a certain frequency. This frequency will be considered when deducing the angular movements about the standing and the elevation axis.

For example, moving pedestrians and cars can occlude parts of a scan area. A known method to reduce their impact is scanning the area twice. Obviously, the scan time is doubled, and post processing is necessary to identify and delete the data of unwanted objects.

Some aspects of the inventive solution allow an improvement of the known method by doubling the angular velocity about the standing axis, resulting in a doubled spacing in-between measuring points, and by shifting the start of a second scan and/or by calculating a different scan path in a way that increases the time between the measurements of neighboring points. Moving objects produce distance measurement points without neighbors with similar values. Inconsistent distance measurements can be omitted, thereby reducing the effect of moving objects. Hence, the impact of moving objects in the scan area is reduced without special post processing and additional scan time.

BRIEF DESCRIPTION OF THE DRAWINGS

The surveying device according to some aspects of the invention is described or explained in more detail below, purely by way of example, with reference to working examples shown schematically in the drawing. Identical elements are labelled with the same reference numerals in the figures. The described embodiments are generally not shown true to scale and they are also not to be interpreted as limiting the invention. Specifically.

DETAILED DESCRIPTION

Figure 1:
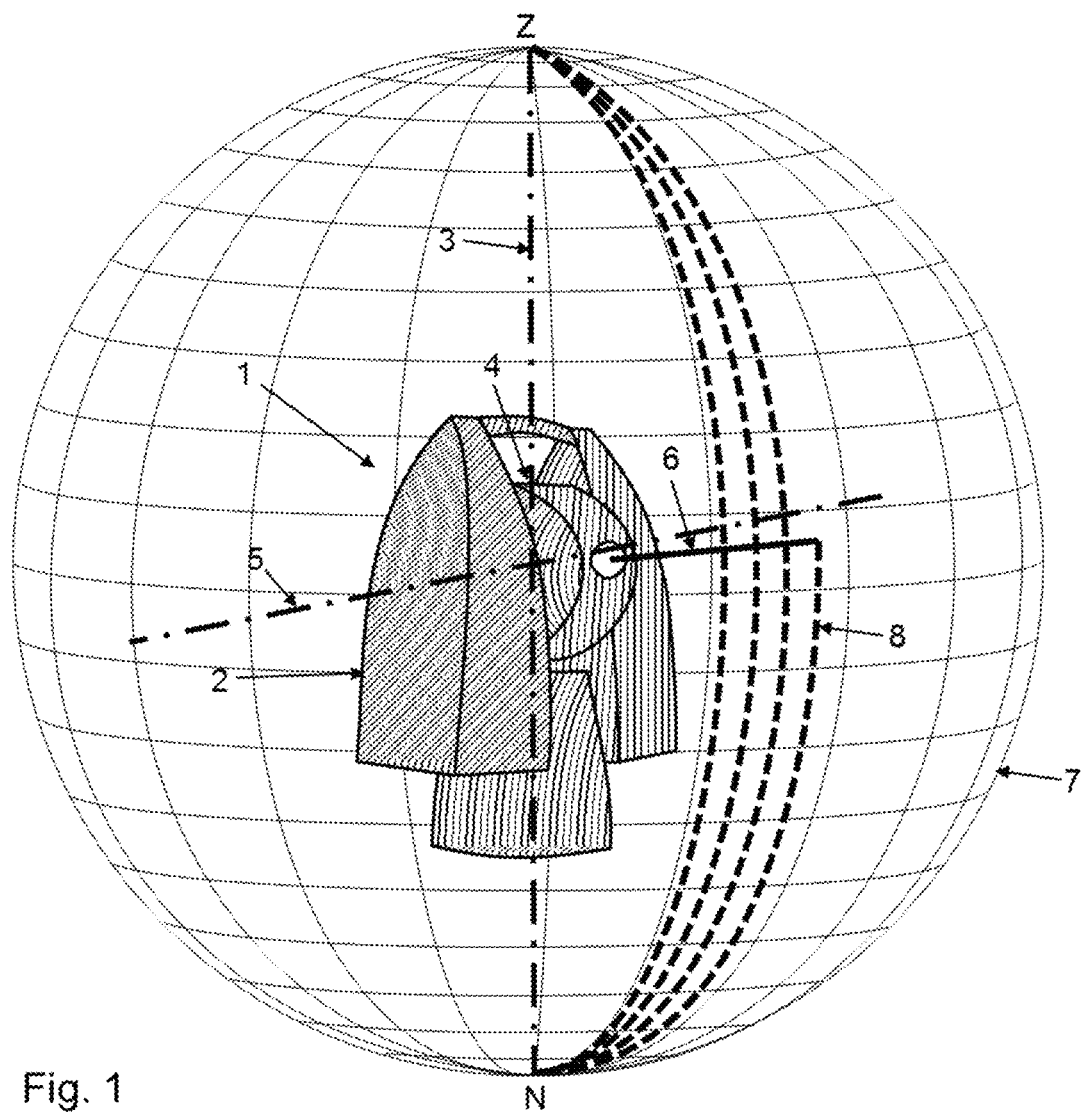
FIG. 1: is a schematic perspective view of a total station according to the state of the art with a section of a scan track visualized on a unit sphere.

FIG. 1 shows a total station 1 according to the state of the art with an alidade 2 mounted on a base, not shown, and being rotatable about the standing axis 3 in a motor driven manner A telescope unit 4 is mounted on the alidade 2 and is movable in the form of a tilting motion about an elevation axis 5 in a motor driven manner. The telescope unit 4 comprises a beam exit for a laser measuring beam 6 defining a target axis. The elevation axis 5 is substantially orthogonal to the standing axis 3. According to the state of the art, the telescope unit 4 has a smaller weight then the alidade 2 and for scanning it is rotated with a higher constant speed of rotation then the alidade 2. For a full dome scan the alidade is rotating at least over half a circle (200 gon, 180°).

A part of a scanning task with a fast rotating telescope unit 4 and a slower rotating alidade 2 is visualized on a unit sphere 7 with its center at the intersection point of the standing axis 3 and the elevation axis 5. The intersection of the measuring beam 6 with the unit sphere 7 is moving along a path 8. Distance measuring points are generated with a constant triggering frequency and are essentially spaced with equal spacing on the path 8. The equal spacing is due to the fact that the telescope unit 4 is rotating much faster than the alidade 2. The measuring path 8 is passing by the zenith Z and by the nadir N during each rotation of the telescope unit 4. Therefore, the path density and correspondingly the measuring point density are very high in areas at the zenith Z and at the nadir N and lower in equatorial areas. The high number of distance measurements and the corresponding costly data handling for measuring points in these areas are needless since for the majority of scanning tasks these areas are of low interest. Therefore, the known scanning with a fast rotating telescope unit 4 and a slow rotating alidade 2 doesn't sufficiently reduce the time consumption for a scanning task.

Figure 2:
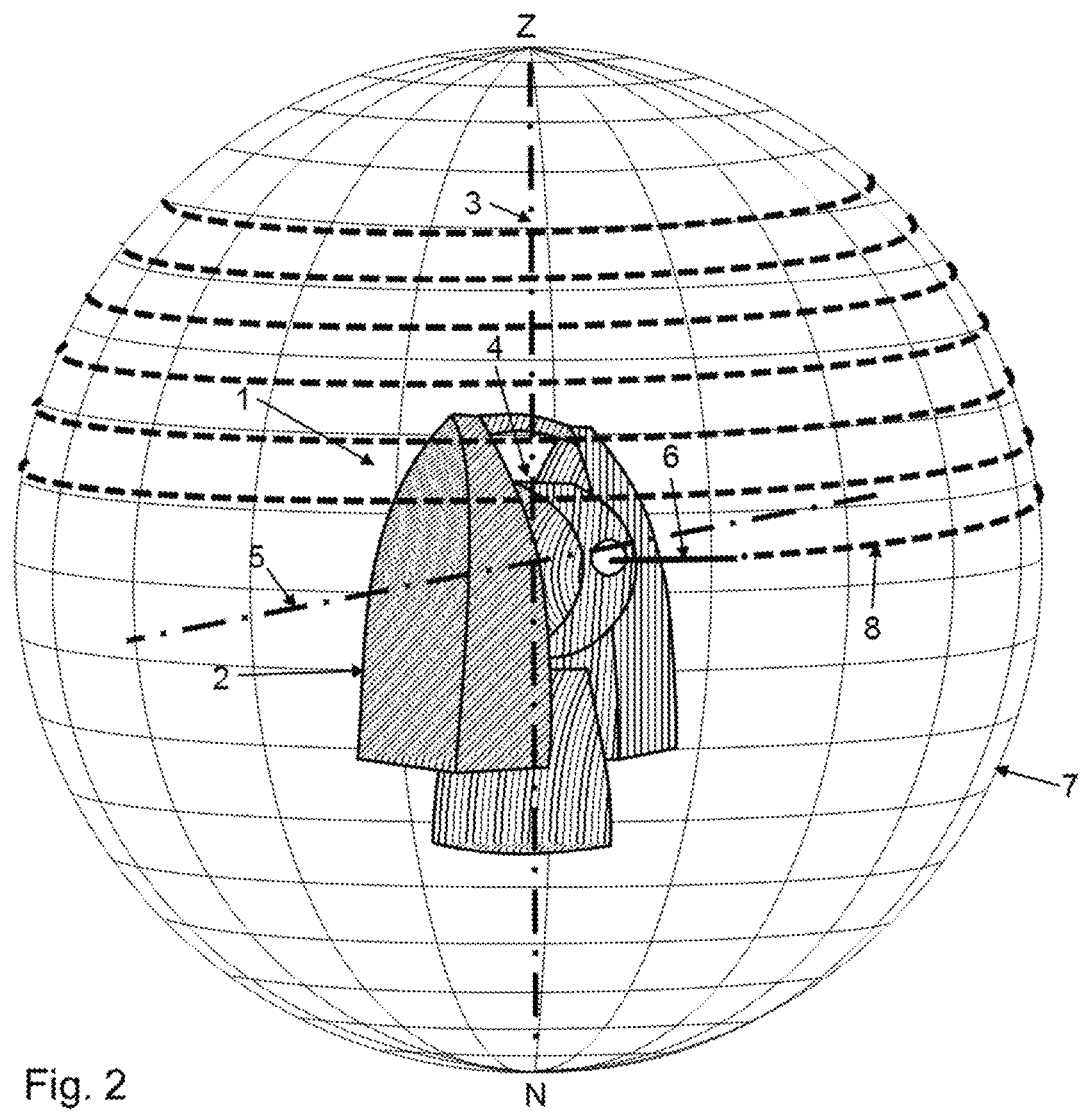
FIG. 2 is a schematic perspective view of a total station according to an embodiment of the present invention with a section of a scan track visualized on a unit sphere.

FIG. 2 shows an embodiment of an inventive total station 1 with an alidade 2 mounted on a base, not shown, and being rotatable about the standing axis 3 in a motor driven manner A telescope unit 4 is mounted on the alidade 2 and is movable in the form of a tilting motion about an elevation axis 5 in a motor driven manner. The telescope unit 4 comprises a beam exit for a laser measuring beam 6 defining a target axis. The elevation axis 5 is substantially orthogonal to the standing axis 3. The alidade 2 is rotated with a higher speed of rotation then the telescope unit 4.

A part of a scanning task with a fast rotating alidade 2 and a slower rotating telescope unit 4 is visualized on the unit sphere 7 with its center at the intersection point of the standing axis 3 and the elevation axis 5. The intersection of the measuring beam 6 with the unit sphere 7 is moving along a path 8. A constant turning of the alidade 2 and an up and/or down motion of the telescope unit 4 is generating spiral paths 8 on the unit sphere 7. The telescope unit 4 has a smaller moment of inertia than the alidade 2 and the angular velocity of the tilting motion of the telescope unit 4 about the elevation axis 5 is smaller than the angular velocity of the alidade 2 about the standing axis.

Small sections of the path 8 have longer components around the standing axis than around the elevation axis. The lengths of sections of path 8 which are extending over a given angle around the standing axis are getting shorter with shorter distances to the standing axis and bigger angles to the equator, respectively. In equatorial regions of the unit sphere 7, sections of path 8 which are extending over a given angle around the standing axis have similar lengths. The measuring points projected onto the unit sphere are then evenly distributed in the equatorial regions. The tilting motion of the telescope unit 4 about the elevation axis 5 is controlling the gap between neighboring measuring points on successive turns of the path 8 around the standing axis 3.

Figure 3:
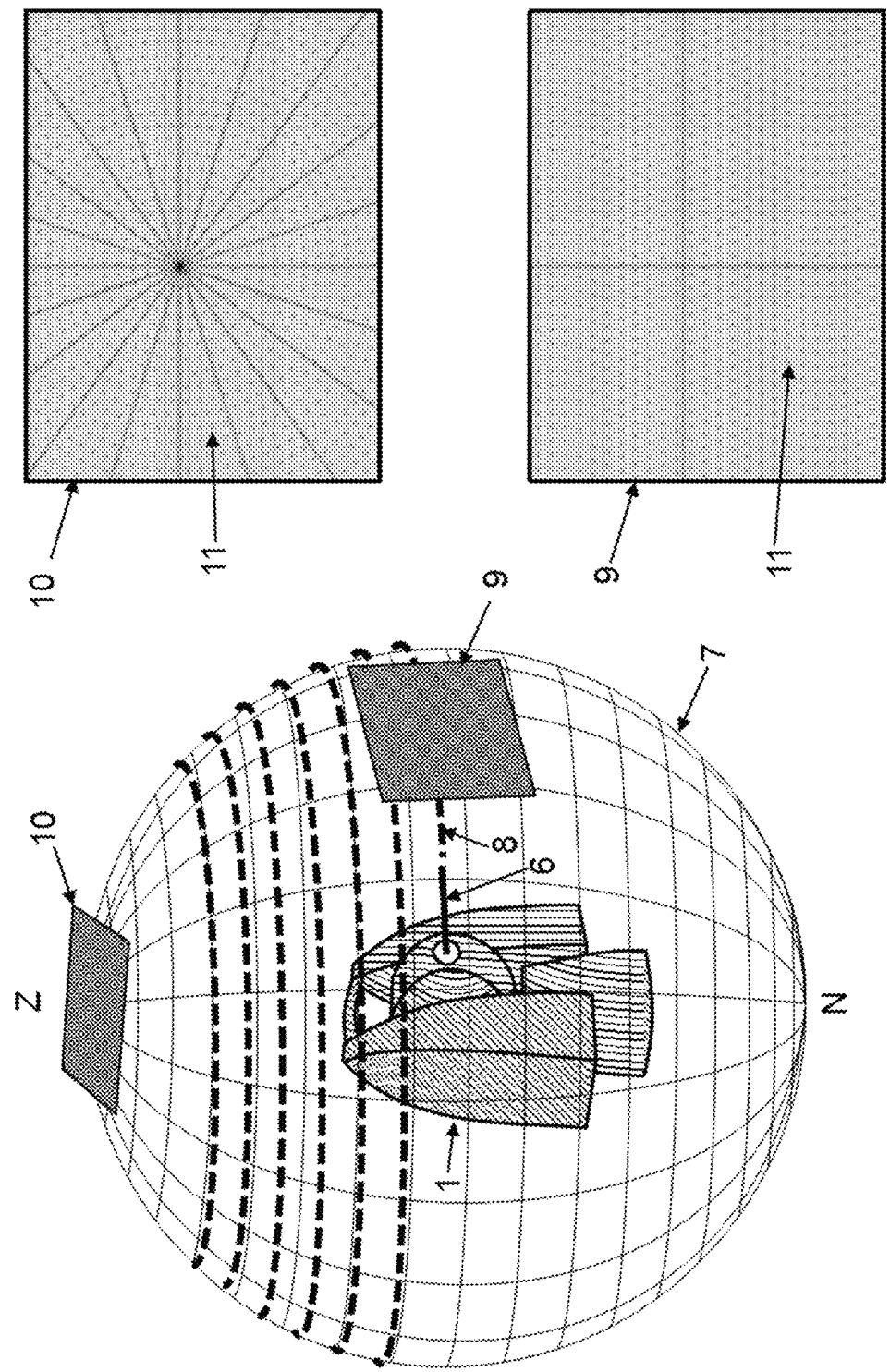
FIG. 3 is a schematic view of a total station according to FIG. 2 with distance measuring points visualized on two indicated areas.

FIG. 3 shows an embodiment of an inventive total station 1 where the measuring points 11 have more or less the same density in an equatorial area 9 and in a zenith area 10. This is due to the fact that the distance measurements are triggered depending on the elevation of the measuring beam 6 and therefore on its angular alignment around the elevation axis 5. Maximum frequency triggering is applied at a horizontal angular alignment of the measuring beam where the target axis is perpendicular to the standing axis Minimum frequency triggering is applied at a vertical angular alignment of the measuring beam where the target axis is parallel to the standing axis 3. The triggering frequency is increasing with increasing angular distance of the measuring beam from the standing axis. This triggering is depending on the angular alignment around the elevation axis 5 and allows to have similar measuring point densities on all areas of a unit sphere 7.

Therefore, the scan functionality comprises triggering the distance measuring unit for generating the distance measurement data as a function of the rotation angle of the telescope unit 4 about the elevation axis 5.

Figure 4:
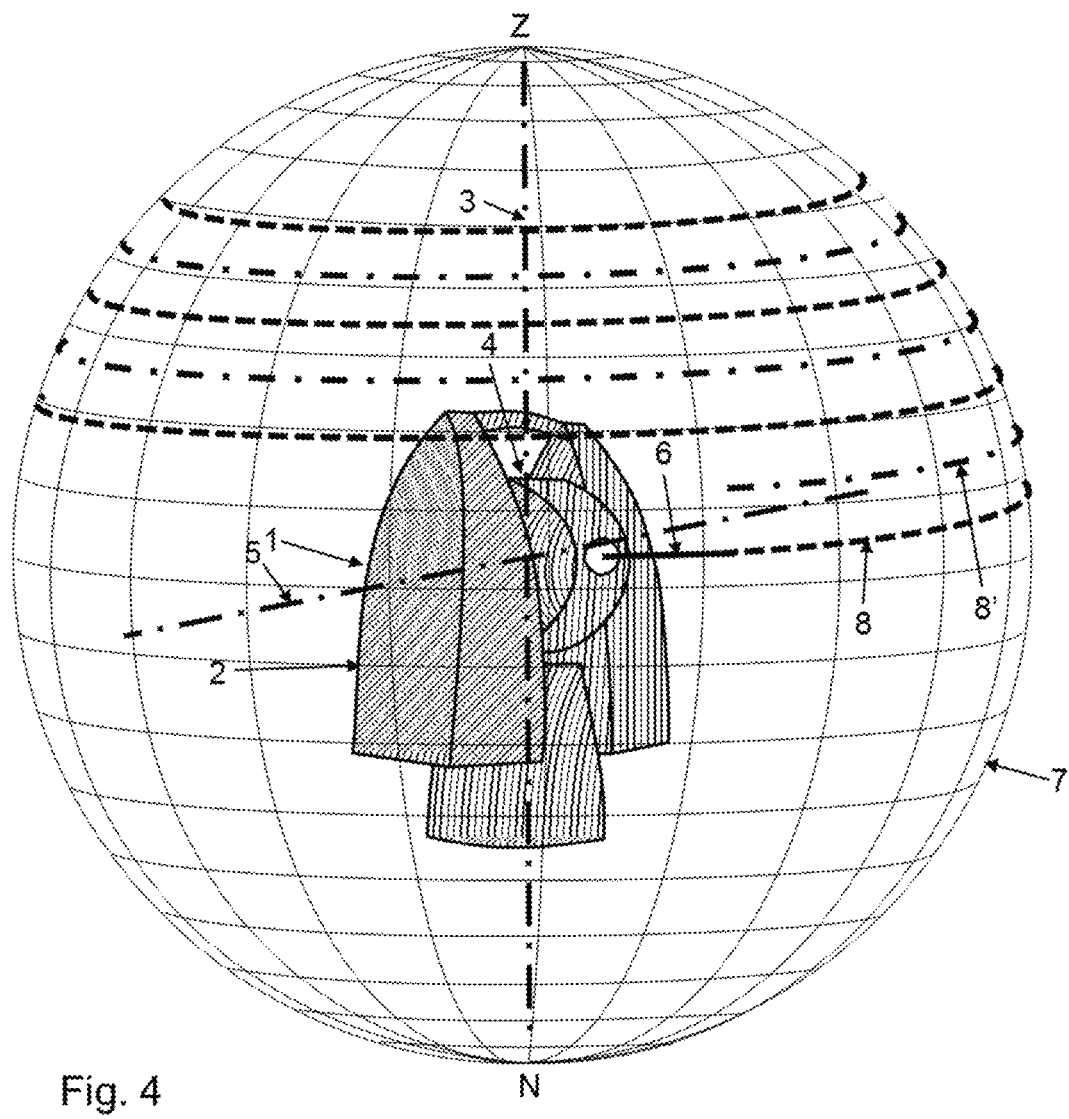
FIG. 4 is a schematic view of a total station according to FIG. 2 with two sections of two different scan tracks visualized on a unit sphere.

FIG. 4 shows an embodiment of an inventive total station 1 with a functionality for generating two spiral paths 8 and 8' as shown in FIG. 2. The turns of the two paths 8 and 8' are offset to each other in such a way that the measuring points from both paths 8 and 8' are evenly spread at least over a part of the unit sphere 7. The paths 8 and 8' shown were both made with the telescope unit 4 turning in the same angular direction. The paths 8 and 8' would have intersections if they would be made with the telescope unit 4 turning in opposite angular directions about the elevation axis and the alidade 2 turning continuously in the same angular direction about the standing axis. Paths with intersections would have at the intersections higher measuring point densities than away from the intersections.

Figure 5:
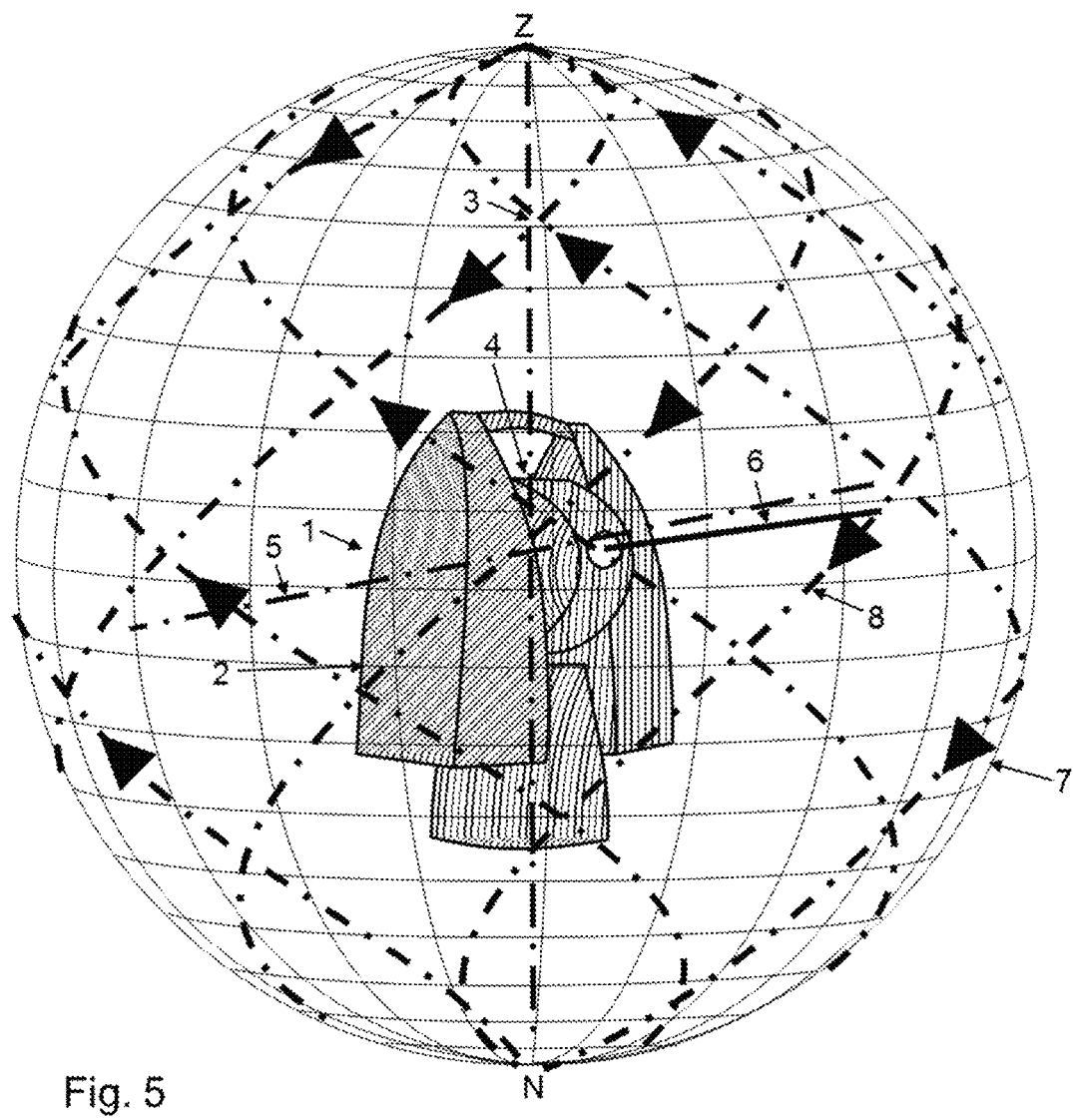
FIG. 5 is a schematic perspective view of a total station according to an embodiment of the present invention with sections of scan tracks visualized on a unit sphere.

FIG. 5 shows an embodiment with a special scan functionality combining the continuous fast rotation of the alidade 2 about the standing axis 3 with a variable angular velocity of the rotating telescope unit 4, wherein the scan sequence is limited to time intervals within which the angular velocity of the revolving motion of the alidade 2 is faster than the angular velocity of the tilting motion of the telescope unit 4 about the elevation axis 5. During the scan sequence the path 8 has a longer component around the standing axis than around the elevation axis, which is the case in a measuring region extending from the equator towards zenith and nadir. In this measuring region distance measurements are made on the path 8 and therefore measurement points are located in this region. The angular velocity about the elevation axis can be varied in such a way that the paths on the unit sphere when projected to a plane have sections which looks similar to sections of a Fibonacci spiral.

In two moving regions extending from a zenith end and from a nadir end of the measuring region the angular velocity of the telescope unit 4 is higher than the angular velocity of the alidade 2 and the path 8 crosses zenith and nadir. In the moving region the path 8 takes a short cut to another part of the measuring region. The directly successive path sections in the measuring region have opposite components around the elevation axis. Therefore, measurements are alternatively made on path sections heading towards zenith and nadir, respectively, wherein these sections are also offset in the direction around the standing axis. This allows within a short time interval to have measuring points on totally different parts of the unit sphere. In the moving regions around zenith and nadir there will be no measurements made because of the increased path density.

Although the invention is illustrated above, partly with reference to some preferred embodiments, it must be understood that numerous modifications and combinations of different features of the embodiments can be made. All of these modifications lie within the scope of the appended claims.

What is claimed is:

1. An industrial or geodetic surveying device comprising:
   a base defining a standing axis;
   an alidade, mounted on the base and being rotatable about the standing axis when driven by a motor;
   a telescope unit comprising a beam exit for a laser measuring beam defining a target axis, the telescope unit being mounted on an alidade and being movable in the form of a tilting motion about an elevation axis relative to the alidade as the motor is driven, the elevation axis being orthogonal to the standing axis;
   a distance measuring unit, configured to generate the laser measuring beam and, based thereof, to provide distance measurement data for determining a distance to an object, wherein the laser measuring beam extends from the telescope unit along a target axis;
   an angle determining unit configured to provide angle determination data for determining the orientation of the alidade to the base and the orientation of the telescope unit to the alidade, respectively; and
   a control unit configured to automatically control a scan functionality of the surveying device, the scan functionality comprising generation of distance measurement data and angle determination data for different scan points set by rotating the alidade about the standing axis and by tilting the telescope unit about the elevation axis, respectively, wherein:
   the scan functionality comprises at least one scan sequence with multiple continual revolutions of the alidade around the standing axis, and
   during the scan sequence:
       the alidade is in a continuous revolving motion with uniform angular velocity about the standing axis, and
       the angular velocity of the alidade about the standing axis is faster than half of the angular velocity of the tilting motion of the telescope unit about the elevation axis.

2. The surveying device according to claim 1, wherein the scan functionality comprises a continuously varying motion of the telescope unit about the elevation axis such that, in a projection onto the unit sphere around the surveying device, the target axis follows a trajectory having a Fibonacci spiral.

3. The surveying device according to claim 1, wherein the control unit is configured to coordinate the angular velocity of the alidade, the tilting motion of the telescope unit, and the distance measuring unit such that, in a projection onto a surface of a unit sphere around the surveying device, a grid with even point spacing is generated.

4. The surveying device according to claim 3, wherein the scan functionality comprises a continuously varying motion of the telescope unit about the elevation axis such that, in a projection onto the unit sphere around the surveying device, the target axis follows a trajectory having a Fibonacci spiral.

5. The surveying device according to claim 1, wherein the scan functionality comprises triggering the distance measuring unit for generating the distance measurement data as a function of the rotation angle of the telescope unit about the elevation axis.

6. The surveying device according to claim 1, wherein the scan functionality comprises a motion of the telescope unit about the elevation axis such that, in a projection onto the unit sphere around the surveying device, the target axis follows a trajectory spiraling around the standing axis.

7. The surveying device according to claim 6, wherein during the scan sequence, the direction of rotation of the tilting motion of the telescope unit is constant.

8. The surveying device according to claim 7, wherein the scan functionality comprises:
   a first movement of the telescope unit about the elevation axis from a defined maximal zenith region to a defined maximal nadir region, or
   a second movement of the telescope unit about the elevation axis from a defined maximal nadir region to a defined maximal zenith region.

9. The surveying device according to claim 3, wherein the scan functionality comprises a motion of the telescope unit about the elevation axis such that, in a projection onto the unit sphere around the surveying device, the target axis follows circular trajectories lying in different spaced-apart planes which are orthogonal to the standing axis.

10. The surveying device according to claim 9, wherein during the scan sequence, the direction of rotation of the tilting motion of the telescope unit is constant.

11. The surveying device according to claim 10, wherein the scan functionality comprises:
    a first movement of the telescope unit about the elevation axis from a defined maximal zenith region to a defined maximal nadir region, or
    a second movement of the telescope unit about the elevation axis from a defined maximal nadir region to a defined maximal zenith region.

12. The surveying device according to claim 1, wherein the scan functionality comprises a continuously varying motion of the telescope unit about the elevation axis such that, in a projection onto the unit sphere around the surveying device, the target axis follows a trajectory having a Fibonacci spiral.

* * * * *